(12) United States Patent
Zhang et al.

(10) Patent No.: US 11,616,705 B2
(45) Date of Patent: *Mar. 28, 2023

(54) METHOD, APPARATUS, AND COMPUTER READABLE STORAGE MEDIUM FOR MANAGING NETWORK SLICES FOR THE BENEFIT OF USERS

(71) Applicant: Nanning FuLian FuGui Precision Industrial Co., Ltd., Nanning (CN)

(72) Inventors: Yong-Jie Zhang, Shenzhen (CN); Jia-Wei Deng, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,246

(22) Filed: Apr. 8, 2022

(65) Prior Publication Data
US 2023/0021138 A1      Jan. 19, 2023

Related U.S. Application Data

(63) Continuation of application No. 17/389,589, filed on Jul. 30, 2021, now Pat. No. 11,336,548.

(30) Foreign Application Priority Data
Jul. 14, 2021 (CN) .......................... 202110797567.6

(51) Int. Cl.
| G06F 15/173 | (2006.01) |
| H04L 43/08 | (2022.01) |
| H04L 41/12 | (2022.01) |
| H04L 43/045 | (2022.01) |
| H04L 47/70 | (2022.01) |
| H04L 41/22 | (2022.01) |

(52) U.S. Cl.
CPC .............. H04L 43/08 (2013.01); H04L 41/12 (2013.01); H04L 41/22 (2013.01); H04L 43/045 (2013.01); H04L 47/827 (2013.01)

(58) Field of Classification Search
CPC ......... H04L 43/08; H04L 41/12; H04L 41/22; H04L 43/045; H04L 47/827
See application file for complete search history.

(56) References Cited

U.S. PATENT DOCUMENTS

| 8,018,874 B1 * | 9/2011 | Owechko ............ H04L 41/0823 370/254 |
| 8,494,989 B1 * | 7/2013 | VanDerHorn ......... H04W 24/02 706/13 |
| 2011/0269491 A1 * | 11/2011 | Eberhart ................ G06N 3/126 706/50 |

(Continued)

Primary Examiner — Padma Mundur
(74) Attorney, Agent, or Firm — ScienBiziP, P.C.

(57) ABSTRACT

A method for managing network slices for the benefit of users monitors and obtains key performance indicators configured by a user, the indicator values being collected in real time and visually presented. When a user wants to optimize the network slices, weightings, value intervals, and variables are applied by the user to target key performance indicators. The network slices are optimized by a particle swarm algorithm configured by the user. A device and a computer readable and permanent storage medium for executing the network slices management method are also disclosed.

10 Claims, 9 Drawing Sheets

(56) References Cited

U.S. PATENT DOCUMENTS

| | | | |
|---|---|---|---|
| 2012/0310618 A1* | 12/2012 | B'Far | G06F 11/3447 |
| | | | 703/13 |
| 2015/0082308 A1* | 3/2015 | Kiess | G06F 9/45558 |
| | | | 718/1 |
| 2016/0105325 A1* | 4/2016 | Fletcher | G06F 3/0482 |
| | | | 715/737 |
| 2016/0105330 A1* | 4/2016 | Choudhary | H04L 43/04 |
| | | | 715/736 |

\* cited by examiner

| Target KPI | | Weighting | Value Interval |
|---|---|---|---|
| V | KPI1 | 1 | 0.9 ~ 1 |
| V | KPI2 | 5 | 0.85 ~ 1 |
| ☐ | KPI3 | | |

METHOD, APPARATUS, AND COMPUTER READABLE STORAGE MEDIUM FOR MANAGING NETWORK SLICES FOR THE BENEFIT OF USERS

FIELD

The subject matter herein generally relates to network communications, and more particularly, to a method for managing network slices, an apparatus, and a computer readable storage medium thereof.

BACKGROUND

Existing network slicing is done according to predefined scenarios, and cannot be customized according to needs of users. The allocating of network slices wastes a large amount of resources.

Once the network slices are deployed or allocated, there is no performance monitoring and dynamic adjusting. If a network problem occurs, it is impossible to analyze the network problem the first time that it happens, and there is also a lack of predictive maintenance of the network status.

To manage network slices, solutions are needed.

BRIEF DESCRIPTION OF THE DRAWINGS

Implementations of the present technology will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 1:
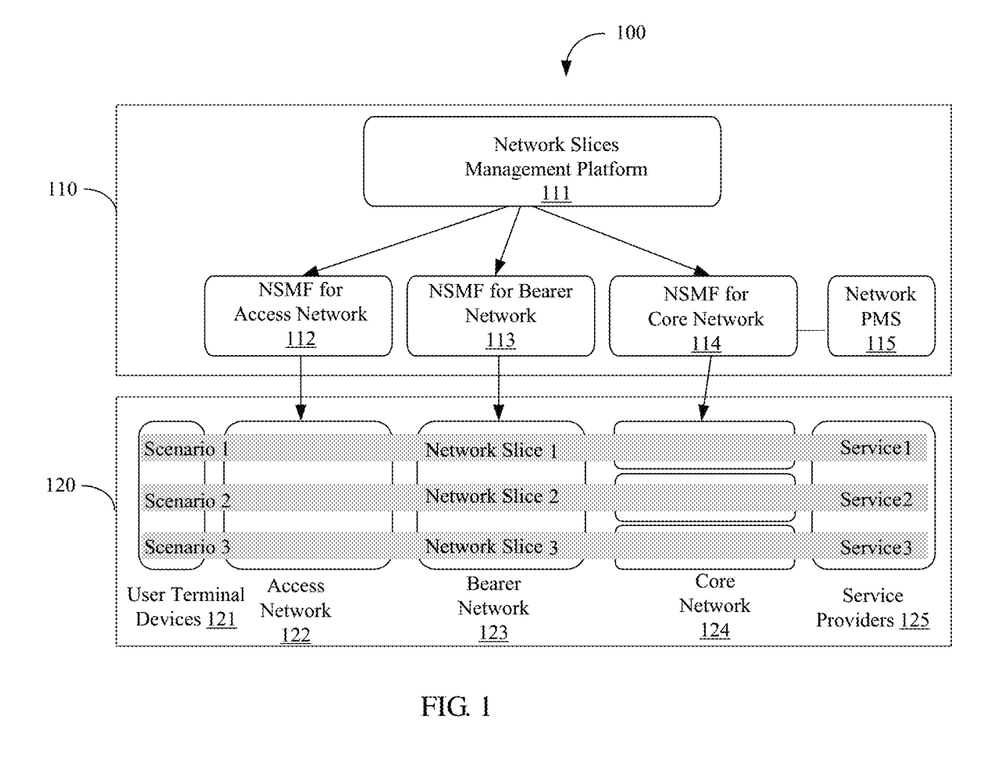
FIG. 1 is a block diagram of one embodiment of a network slices management system.

FIG. 1 is a network slices management system 100. In one embodiment, the connections between network elements in the network slices management system 100 are logical connections, rather than direct physical connections. In one embodiment, the network slices management system 100 comprises a network management plane 110 and a network user plane 120. The network management plane 110 is configured to receive scenario selection of service applications from users, and to configure and manage network resources. The service requirements are determined according to service level agreement between users and a service provider. The network user plane 120 is configured to provide a plurality of user terminal devices 121 and a plurality of service providers 125 for the transfer of data therebetween.

In one embodiment, the network management plane 110 comprises a network slices management platform 111, a network slices management function (NSMF) for access network 112, a NSMF for bearer network 113, a NSMF for core network 114, and a network performance management system (PMS) 115.

The network slices management platform 111 is configured to receive service requirements, and send the access network slicing requirements, bearer network slicing requirements, and core network slicing requirements to the NSMF for access network 112, the NSMF for bearer network 113, and the NSMF for core network 114.

The NSMF for access network 112, the NSMF for bearer network 113, and the NSMF for core network 114 orchestrate end-to-end slicing services according to network slicing requirements, and deliver the orchestration results to slice management modules in an access network 122, a bearer network 123, and a core network 124, to create network slices.

The network PMS 115 is configured to collect performance data uploaded by each network element in the network slices management system 100, and analyze the performance data, so as to be aware of the status of each network element, and provide users with a report of the entire network operating status and performance alerts when appropriate. Taking the example shown in FIG. 1 as an example, network slices comprise network slices 1, 2, and 3, which are logical networks that provide specific network capabilities and network characteristics, and meet service requirements of users.

The network slices management platform 111 finally provides users with the network slices 1, 2, and 3 so that users can use the network slices 1, 2, and 3 for data transmission. The network slices 1, 2, and 3 respectively comprise slices of the access network 122, slices of the bearer network 123, and slices of core network 124. In the example shown in FIG. 1, the scenarios 1, 2, and 3 of service applications executed by the user terminal devices 121 can be connected to different services 1, 2, and 3 provided by the service providers 125 through the network slices 1, 2, and 3.

In the embodiment, the arrangement of the network elements in the network slices management system 100 is only a logical function division, there may be other arrangement methods in implementations. In one embodiment, the network elements such the network slices management platform 111, the NSMF for access network 112, the NSMF for bearer network 113, the NSMF for core network 114, and the network PMS 115 can be deployed on a same network apparatus. In another embodiment, the network slices management platform 111, the NSMF for access network 112, the NSMF for bearer network 113, the NSMF for core network 114, and the network PMS 115 can be deployed on different network apparatuses.

The network slices management method and apparatus provided by the present invention are described with reference of the accompanying drawings.

Figure 2:
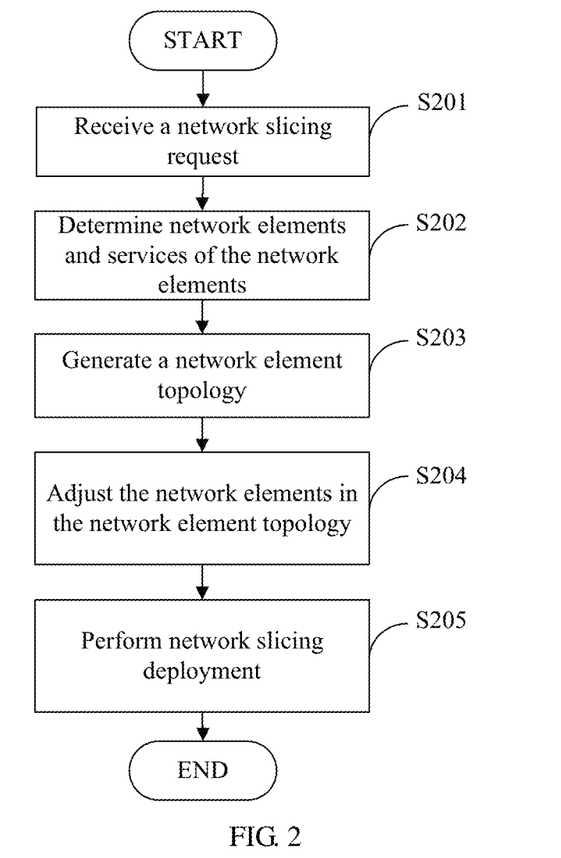
FIG. 2 is a flowchart of one embodiment of a network slices management method.

FIG. 2 is a flowchart of a network slices management method. It should be noted that the underlying concept of the present embodiment(s) would not change if one or more blocks (or steps) were added to or removed from the method. Taking a core network as an example, the creation and deployment of network slices in the core network 124 is illustrated. The network slices management apparatus in the method may be the NSMF for core network 114 as in FIG. 1, and the method may comprise, but is not limited to, the following steps:

At step S201, the network slices management apparatus receives a network slicing request, where the network slicing request comprises a scenario and a service requirement.

In one embodiment, the network slices management apparatus receives the network slicing request from the network slices management platform 111.

Figure 3:
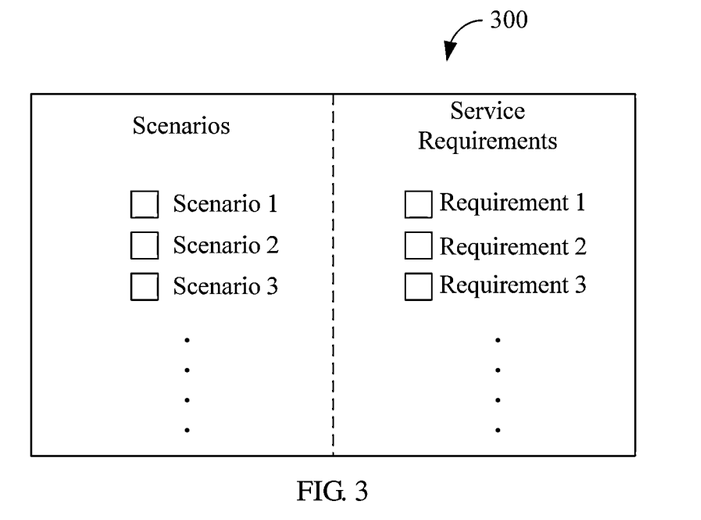
FIG. 3 is a schematic diagram of one embodiment of a graphical user interface in the system of FIG. 1.

In another embodiment, the network slices management apparatus may comprise the network slices management platform 111 in FIG. 1, and the network slices management apparatus provides a graphical user interface for a user to make network slicing requests. As an example, FIG. 3 shows a graphical user interface 300 set up for obtaining a network slicing request. The user can select different scenarios and corresponding service requirement through the graphical user interface 300 to form the network slicing request.

At step S202, the network slices management apparatus determines network elements and services of the network elements according to the scenario and the service requirement.

In one embodiment, the network slices management apparatus performs tailoring of network function according to the scenario and the service requirement, and can deploy necessary network elements according to the network slicing request.

Figure 4:
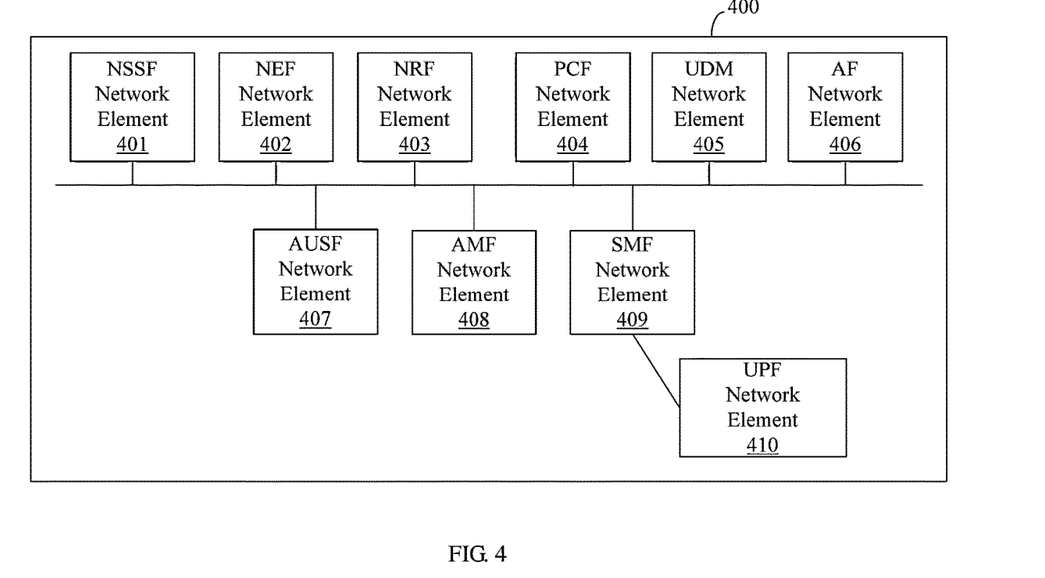
FIG. 4 is a schematic diagram of one embodiment of a core network architecture of the system of FIG. 1.

FIG. 4 is architecture of the core network 400 based on 3GPP standards. The network functions of the core network 400 are divided into a control plane and a user plane, comprising: a network slice selection function (NSSF) network element 401, a network exposure function (NEF) network element 402, a network repository function (NRF) network element 403, a policy control function (PCF) network element 404, a unified data management (UDM) network element 405, an application function (AF) network element 406, an authentication server function (AUSF) network element 407, an access and mobility management function (AMF) network element 408, a session management function (SMF) network element 409, and a user plane function (UPF) network element 410.

The AMF network element 408 provides, to user terminal devices, registration, connection, access verification and authorization, mobility, and reachability management, and provides session management message transmission between user terminal devices and the SMF network element. The SMF 409 network element manages session establishment, update, and release. The UPF 410 network element routes data flow of user terminal devices to the data network In one embodiment, the network slices management apparatus utilizes the AMF network element 408, the SMF network element 409, and the UPF network element 410 as basic network elements, other network elements can be selected according to different scenarios.

Specifically, scenarios are differentiated based on a number of user terminal devices and network performance requirements. When there is a small number of user terminal devices and no network performance requirements, the network slices management apparatus determines and configures one AMF network element 408, one SMF network element 409, and one UPF network element 410 for the scenario.

When there is a large number of user terminal devices and no network performance requirements, one NRF network element 403 is added in addition to one AMF network element 408, one SMF network element 409, and one UPF network element 410. The NRF network element 403 provides service discovery for the scenario.

When there are network performance requirements, such as high-speed and low-latency requirements, one NRF network element 403 and one NSSF network element 401 are added in addition to one AMF network element 408, one SMF network element 409, and one UPF network element 410.

In one embodiment, a predefined threshold can be used to determine an instant number of the user terminal devices. For example, the predefined threshold number is set as 5000. When the number of user terminal devices is less than 5000, the scenario will relate to the small number of the user terminal devices. When the number of user terminal devices is larger than or equal to 5000, the scenario will relate to the larger number of the user terminal devices.

In one embodiment, the network slice management apparatus also determines the services of the network elements according to the service requirements corresponding to the scenario.

Specifically, each network element comprises a plurality of services. The plurality of services comprises necessary services and optional services. The necessary services are preset and can be enabled, the optional services are preset as disabled.

The network slices management apparatus determines whether to enable the optional services according to the service requirements. For example, the network slices management apparatus can determine that a mobility management service of the AMF network element 408 should be enabled, to allow mobility if required.

The management apparatus can determine that a registration management service of the AMF network element 408 and a bill management service of the SMF network element 409 should be enabled according to user account requirements.

In one embodiment, the optional services of the AMF network element 408 comprise the registration management service and a mobility management service, the optional services of the SMF network element 409 comprise a policy control service, a service quality differentiated service, and a charging policy service, and the optional services of the UPF network element 410 comprise a data forwarding service, a data optimization service, and a requirement awareness service.

At step S203, the network slices management apparatus generates a network element topology according to the determined network elements.

The network slices management apparatus generates the network element topology according to the network elements as determined and visually represents the network elements topology on the graphical user interface.

At step S204, the network slices management apparatus adjusts network elements in the network element topology according to a set of adjustment instructions to form a network slicing topology.

In one embodiment, the network slices management apparatus provides users with the graphical user interface to adjust network elements in the network element topology, the adjusting comprising adding, deleting, or connecting network elements by dragging and dropping.

At step S205, the network slices management apparatus performs network slicing deployment according to the network slicing topology and a deployment strategy.

In one embodiment, the deployment strategy comprises determining geographic locations of deployment according to characteristics of network elements in the network slicing topology. The geographical locations can be divided into central cloud, edge cloud, and proximity of user terminal device according to distances from the user terminal devices. In one embodiment, the network elements in the user plane (such as UPF network elements 410) are deployed close to the user terminal devices. The UDM network elements 405, the PCF network elements 404 and other network elements involve large amounts of data stored deployed at the edge of the cloud of high performance mass storage devices. Other network elements in the control plane are deployed in the center of the server cloud.

Figure 5:
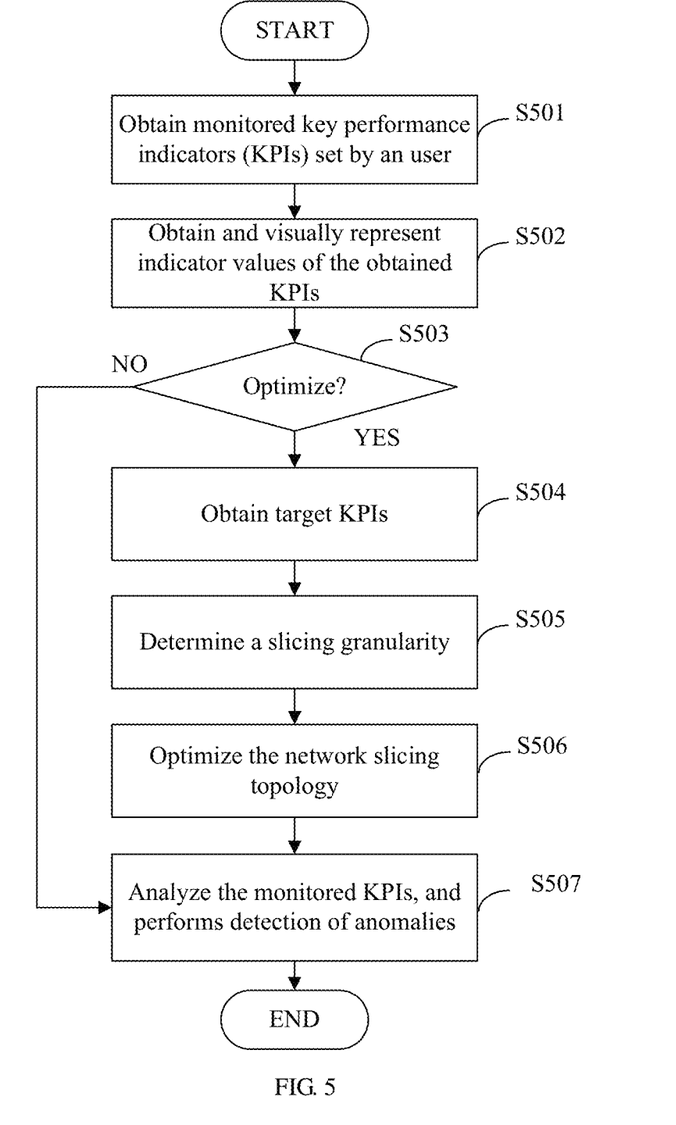
FIG. 5 is a flowchart of another embodiment of the network slices management method.

FIG. 5 is a flowchart of a network slices management method according to another embodiment. Taking the core network as an example, dynamic optimization of network slices in the core network is described. The network slices management apparatus in this method may be the NSMF for the core network in FIG. 1, the method may comprise, but is not limited to, the following steps:

At step S501, the network slices management apparatus monitors and obtains key performance indicators (KPIs) set by the user.

In one embodiment, obtained KPIs comprise: number of user terminal devices, peak data rate, bandwidth, end-to-end delay, uplink throughput, and downlink throughput, etc. The network slices management apparatus visually represents a KPI list in the graphical user interface for the user to select the KPIs to be monitored.

At step S502, the network slices management apparatus obtains values of the obtained KPIs, and visually represents the KPIs and indicator values in the graphical user interface.

In one embodiment, the network slices management apparatus collects performance data in the network slicing topology through the network PMS 115 as in FIG. 1, and converts the relevant performance data into the indicator values of the KPIs according to certain algorithms. In another embodiment, the network slices management apparatus comprises the network PMS 115 as in FIG. 1. The network slices management apparatus also visually represents indicator values through the graphical user interface.

At step S503, the network slices management apparatus determines whether to optimize the network slicing topology.

In one embodiment, the network slices management apparatus obtains a user input as to user satisfaction with the indicator values of the obtained KPIs through the graphical user interface. When the user input indicates dissatisfaction with values of the obtained KPIs, the network slices management apparatus determines to optimize the network slicing topology, and step S504 is executed. Otherwise, when the user input indicates user satisfaction with the indicator values of the obtained KPIs, the network slices management apparatus determines that the network slicing topology does not need to be optimized, and step S507 is executed.

At step S504, the network slices management apparatus obtains target KPIs, corresponding weightings and value intervals set by the user.

In one embodiment, the network slices management apparatus visually represents the obtained KPIs in the graphical user interface, obtains the target KPIs, and the weightings and the value intervals set by the user through the graphical user interface. In one embodiment, each value interval comprises an upper bound and a lower bound set for each target KPI.

Figure 6:
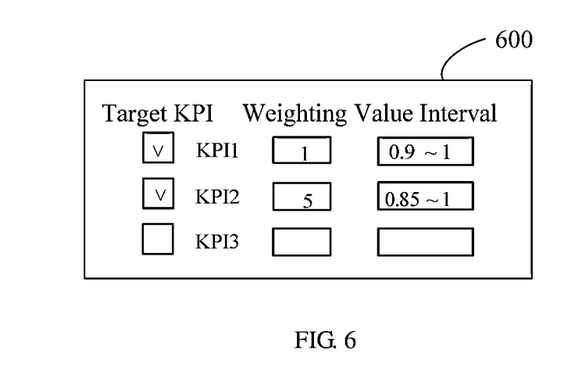
FIG. 6 is a schematic diagram of another embodiment of the graphical user interface.

In one embodiment, the indicator values of some obtained KPIs may be extremely large, such as uplink throughput and downlink throughput, and the indicator values of some obtained KPIs may be represented by true (true=1) and false (false=0). Therefore, the network slices management apparatus may first use a normalized computation method to scale the value interval of each obtained KPI to between 1 (one) and 0 (zero). Taking FIG. 6 for example, the target KPIs provided by a graphical user interface 600 comprise KPI1, KPI2, and KPI3. The weight corresponding to KPI1 is set to 1 and the corresponding value interval is set at 0.9 to 1. The weight corresponding to KPI2 is set to 5 and the corresponding value interval is set at 0.85 to 1.

At step S505, the network slices management apparatus obtains variables set by the user, and determines a slicing granularity according to the variables, where the variables comprise a number of each network element, computing resources of physical network devices, storage resources of the physical network devices, and network resources of the physical network devices.

In one embodiment, the network slices management apparatus visually represents a list of variables that can be set by the user through the graphical user interface. In the embodiment, after initial deployment of the network slicing topology, only the number of AMF network elements 408 and the number of UPF network elements 410 can be adjusted. The network slices management apparatus can provide the number of AMF network elements 408, the number of UPF network elements 410, the computing resources, the storage resources, and the network resources as the variable list through the graphical user interface. Each element in the variable list comprises values that can be selected and set by the users.

In one embodiment, the network slices management apparatus may also provide a list of sub-variables for each variable for the users to select and set. For example, the sub-variables of the network resources of the physical network devices comprise frequency band, number of the physical network resource devices, number of ports, bandwidth, and so on.

At step S506, the network slices management apparatus optimizes the network slicing topology by a particle swarm algorithm according to the target KPI and corresponding weighting value interval, variables, and the slicing granularity.

At step S507, the network slices management apparatus analyzes the indicator values of the obtained KPIs, and performs detection of anomalies.

Figure 7:
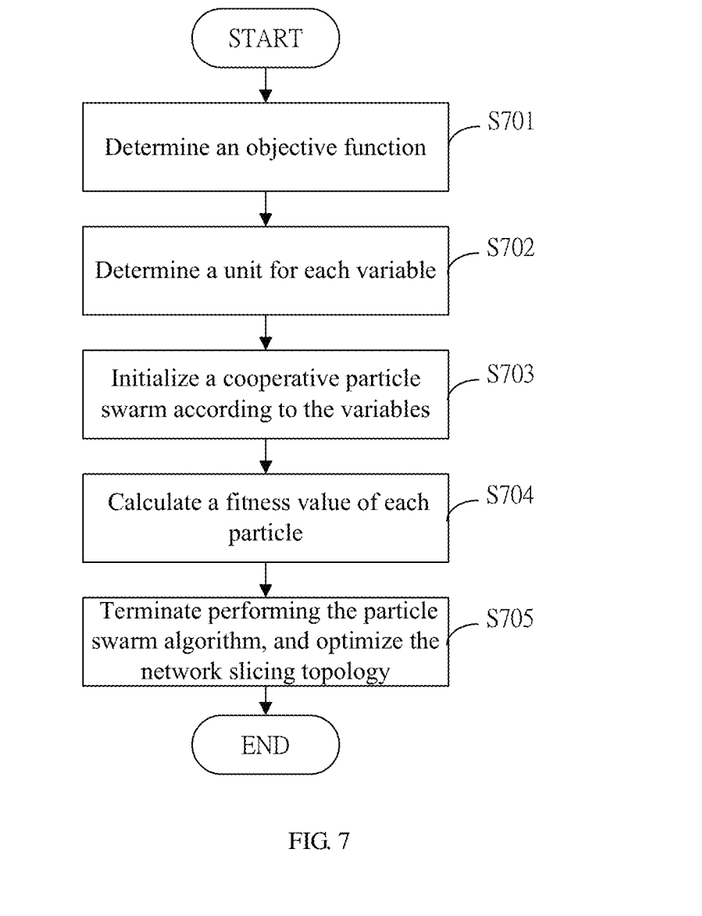
FIG. 7 is a flowchart illustrating optimization and adjustment of network slices by a particle swarm algorithm in one embodiment.

In one embodiment, the steps of using the particle swarm algorithm to optimize the network slicing topology in step S506 are shown in FIG. 7, comprising but not limited to the following steps:

At step S701, the network slices management apparatus determines an objective function according to the target KPIs, the weightings, and the value intervals.

In one embodiment, the network slices management apparatus determines the objective function according to the target KPIs and its corresponding weightings and value intervals, where the objective function comprises maximization of the indicator values of the target KPIs. For example, the objective function P can be determined using the following formula (formula 1):

$$P = \sum_{z=1}^{n} KPIz * Kz, \quad \text{(formula 1)}$$

where KPIz represents the indicator value obtained by the z-th target KPI according to the variables, and Kz is the weight corresponding to the z-th target KPI.

At step S702, the network slices management apparatus determines a unit for each of the variables according to the slicing granularity.

In one embodiment, the determination by the network slices management apparatus as to the unit for each variable according to the slicing granularity comprises dividing computing resources, storage resources, and network resources into computing resource slices, storage resource slices, and network resource slices.

At step S703, the network slices management apparatus initializes a cooperative particle swarm according to the variables, and determines an initial velocity and an initial position of each particle in the cooperative particle swarm.

In one embodiment, each particle in the cooperative particle swarm represents a topology of network elements and resource allocation for the network slices in the network slicing topology.

Specifically, each particle in the particle swarm represents a network element topology and its resource allocation. In one embodiment, the number of particles is determined as a predefined multiple of the total number of network elements. The initial velocity of each particle is a random velocity value, the initial position is predefined for each scenario, and each variable has a positive velocity vector and a negative velocity vector.

At step S704, the network slices management apparatus calculates a fitness value of each particle according to the objective function in each iteration of the particle swarm algorithm. Each particle is substituted into the objective function to calculate the fitness value of the objective function of each particle, and an individual optimal solution for fitness value and a global optimal solution for fitness value are obtained, and the velocity of each particle is iteratively updated according to the individual optimal solution and the global optimal solution.

In one embodiment, the network slices management apparatus performs a mutation operation according to the velocity vectors, to update the velocity.

In one embodiment, the network slices management apparatus deletes some of the particles according to a deletion rule, and updates the individual optimal solution and the global optimal solution. For example, the objective function comprises the calculation of a process related to indicator values of the target KPIs, the one or more particles having indicator values that fall outside the value intervals of the target KPIs being deleted.

In one embodiment, the network slices management apparatus deploys the network slices corresponding to each particle of each iteration to the virtual machine, sets the number of user terminal devices and the traffic loading of the uplink and the downlink according to the scenario and corresponding service requirements, and performs a simulation to obtain the indicator values of the target KPIs when calculating the fitness value of the objective function for the each particle.

In one embodiment, when the optimal global solution corresponds to multiple particles, the optimal particle is selected as the variable with a smaller value of change, so as to avoid a waste of slicing resources.

At step S705, the network slices management apparatus terminates the running of the particle swarm algorithm when termination conditions are met. In one embodiment, the termination conditions comprise the global optimal solution obtained in a (n+1)-th iteration being not better than the global optimal solution obtained in the n-th iteration, and the number of iterations reaching the preset iteration upper limit, where n is a positive integer. The nth iteration or the iteration that reaches the preset iteration upper limit is taken as the last iteration, and the network slices management apparatus performed optimization according to the network elements topology and resource allocation of the particle corresponding to the global optimal solution obtained in the last iteration.

Figure 8:
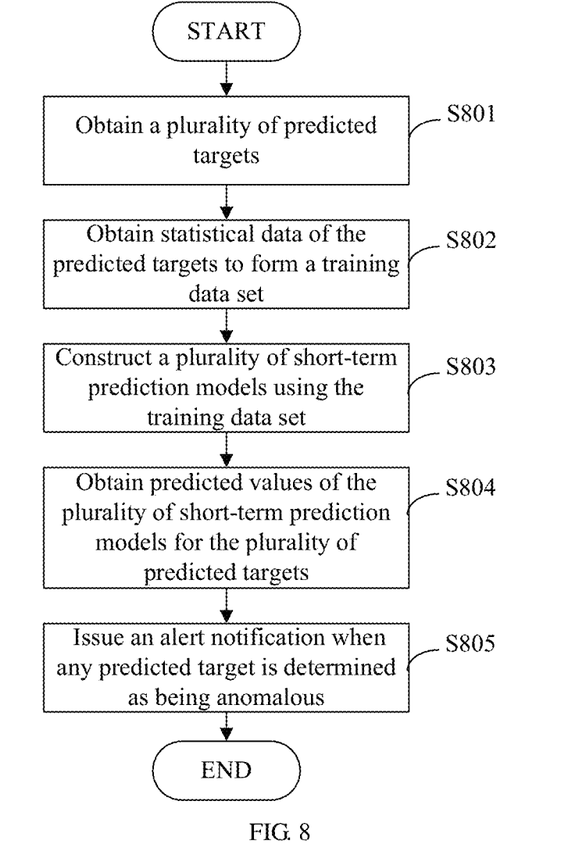
FIG. 8 is a flowchart of one embodiment of short-term prediction of monitored key performance indicators.

In one embodiment, the analysis and detection of anomalies of the indicator values of the obtained KPIs in step S507 of FIG. 5 also comprise short-term prediction of obtained KPIs. The short-term prediction of the monitored KPIs comprising steps shown in FIG. 8, and, but not limited to, the following steps:

At step S801, the network slices management apparatus obtains a plurality of predicted targets, where the plurality of predicted targets comprises a mobility indicator, a maintainability indicator, a service integrity indicator, an accessibility indicator, an availability indicator, and a coverage indicator.

In one embodiment, the network slices management apparatus visually represents a list of obtained KPIs in the graphical user interface for the user to select the predicted targets. The user can select a certain number of obtained KPIs as the predicted targets.

In one embodiment, the network slices management apparatus determines a maximal number of obtained KPIs that the user can select, and determines an upper threshold value and a lower threshold value for each predicted target.

At step S802, the network slices management apparatus performs calculations on the predicted targets to obtain statistical data to form a training data set.

Specifically, the network slices management apparatus sets a statistical period, for example ten minutes, as the statistical period to obtain statistical data from historical data values. For time-series algorithms, the network slices management apparatus configures the statistical data of the preset time period as the training data set, for example, takes the statistical data of the last two weeks. For other algorithms, in order to avoid consuming too much computing resources for the modeling training, and to avoid the effect of cold data, the statistical data of a short period of time can be used as the training data set, for example, the statistical data of the last 12 hours.

At step S803, the network slices management apparatus constructs a plurality of short-term prediction models using the training data set, wherein the plurality of short-term prediction models comprise a plurality of linear models and a plurality of non-linear models, and a prediction time point is set as one hour in the future.

In one embodiment, the plurality of linear models comprises an autoregressive model, an autoregressive moving average model, and a summation autoregressive moving average model.

In one embodiment, the plurality of non-linear models comprises radial basis function neural networks, back propagation neural networks, and gradient boosting models.

At step S804, the network slices management apparatus obtains predicted values of the plurality of short-term prediction models for the plurality of predicted targets, and runs a fusion scoring algorithm to obtain fusion scores of the predicted values of the plurality of predicted targets.

In one embodiment, because the indicator values of the obtained KPIs vary over time and the scenarios are changeable, it is difficult for a model constructed by a single algorithm to adapt to all scenarios, and there is no guarantee that the predicted value errors at the next moment will be small. The fusion scoring algorithm is thus required to process the plurality of short-term prediction models. The fusion scoring algorithm comprises: removing the maximum prediction value and the minimum prediction value among the plurality of prediction values of the plurality of predicted targets, and calculating the fusion scores of prediction values of the plurality of prediction targets by summing and averaging. Finally, the predicted values of the plurality of predicted targets and the fusion scores of the plurality of predicted targets are stored in a database. In one embodiment, the plurality of short-term prediction models further comprises priority values, and the fusion scoring algorithm does not remove the highest-priority predicted value of the short-term prediction model in the process of removing the maximum predicted value and the minimum predicted value.

At step S805, the network slices management apparatus determines whether any predicted target is anomalous according to the fusion scores of prediction value of the plurality of predicted targets, and issues an alert when any predicted target is determined as being anomalous.

In one embodiment, the network slices management apparatus determines whether the fusion score of the predicted value of any predicted target is greater than the upper threshold value, or whether the fusion score of the predicted value of any predicted target is less than the lower threshold value. When the network slices management apparatus determines that the fusion score of the predicted value of any predicted target is greater than the upper, or when the fusion score of the predicted value of any predicted target is less than the lower, an alert is issued in real-time, allowing users to optimize the network slicing topology as early as possible.

In one embodiment, when the real time-point reaches the predicted time point, the network slices management apparatus obtains the real indicator values of the plurality of predicted targets, and compares the real values with the predicted values of the plurality of short-term prediction models. The accuracy of the short-term prediction models is ranked by error values of the predicted values of the short-term prediction model, and the priority values are set for the plurality of short-term prediction models according to the accuracy ranking. For example, the six short-term prediction models can be sequentially set with priority values 9, 7, 4, 3, 2, and 1 according to their accuracy ranking. As time continues, the priority values of the short-term prediction models with the most accurate prediction will be higher, and the prediction results will incline thereto. In one embodiment, the network slices management apparatus periodically removes the priority values generated one day ago in the database to prevent cold priority values from affecting the new prediction.

Figure 9:
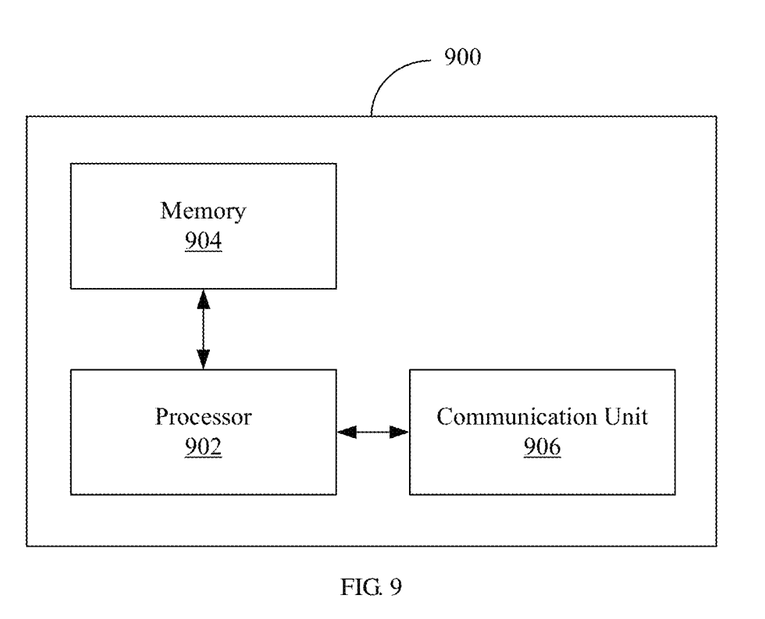
FIG. 9 is a block diagram of a network slices management apparatus, in one embodiment, in the system of FIG. 1.

FIG. 9 is a block diagram of a network slices management apparatus 900.

The network slices management apparatus 900 comprises at least one processor 902, a memory 904, and a communication unit 906. Those skilled in the art should understand that the composition of the network slices management apparatus 900 shown in FIG. 9 does not constitute a limitation of the embodiment of the present application. The network slices management apparatus 900 may further comprise more or less hardware or software, or different modules.

In one embodiment, the at least one processor 902 may be composed of integrated circuits, for example, may be composed of a single packaged integrated circuit, or may be composed of multiple integrated circuits with the same function or different functions, comprising one or a combination of multiple central processing units (Central Processing Unit, CPU), microprocessors, digital processing chips, graphics processors, and various control chips. The at least one processor 902 is the control core (control unit) of the network slices management apparatus 900, which uses various interfaces and lines to connect to various components of the network slices management apparatus 900, and is stored in the memory 904 through operation or execution. The program or module, and a procedure stored in the memory 904 in order to perform various functions of the network slices management apparatus 900 and processing of data, for example, a network slices management functions. The processor 902 is also used to interact with other components.

The memory 904 is used to store program codes and various data, and allow automatic access to programs or data during the operation of the network slices management apparatus 900. The memory 904 comprises a read-only memory (Read-Only Memory, ROM), a programmable read-only memory (Programmable Read-Only Memory, PROM), and an erasable programmable read-only memory (Erasable Programmable Read-Only Memory, EPROM), One-time Programmable Read-Only Memory (OTPROM), Electrically-Erasable Programmable Read-Only Memory (EEPROM), CD-ROM (Compact Disc Read-Only Memory, CD-ROM) or other optical disk storage, magnetic disk storage, tape storage, or any other computer-readable storage medium that can be used to carry or store data.

The memory 904 stores program codes, and the at least one processor 902 can call up the program codes stored in the memory 904 to perform related functions. For example, the program codes of the method flow of FIG. 2, FIG. 5, FIG. 7 and FIG. 8 are executed by the at least one processor 902, so as to realize the functions of the various modules to achieve the purpose of network slices management.

The communication unit 906 is used for communication between the network slices management apparatus 900 and other devices in a wired or wireless manner.

In summary, the network slice management method, apparatus, and computer-readable storage medium can customize network slices according to users' actual scenarios and service needs, and optimize the network slices in real time according to user feedback.

The embodiments shown and described above are only examples. Many details found in the relevant art are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for managing network slices, the method comprising:
    determining, by an apparatus, whether to optimize a network slicing topology based on user inputs;
    obtaining, by the apparatus, target key performance indicators (KPIs), corresponding weightings, value intervals, and variables set by an user when the apparatus determines to optimize the network slicing topology;
    determining, by the apparatus, a slicing granularity according to the variables; and
    optimizing, by the apparatus, the network slicing topology by a particle swarm algorithm according to the target KPIs, the corresponding weightings and value intervals, the variables, and the slicing granularity.

2. The method of claim 1, wherein the variables comprise a number of network elements, computing resources of physical network devices, storage resources of the physical network devices, and network resources of the physical network devices.

3. The method of claim 2, wherein the network resources of the physical network devices comprise: frequency band, number of the physical network devices, number of ports, bandwidth.

4. The method of claim 1, wherein the step of optimizing the network slicing topology by a particle swarm algorithm further comprises:
    determining, by the apparatus, an objective function according to the target KPIs, the weightings, and the value intervals;
    determining, by the apparatus, a unit for each of the variables according to the slicing granularity;
    initializing, by the apparatus, a cooperative particle swarm according to the variables, and determining an initial velocity and an initial position of each particle in the cooperative particle swarm, wherein the each particle in the cooperative swarm represents a topology of the network elements and resource allocation for the network slices in the network slicing topology;
    calculating, by the apparatus, a fitness value of the each particle according to the objective function in each iteration of the particle swarm algorithm;
    obtaining, by the apparatus, an individual optimal solution for fitness value and a global optimal solution for fitness value for the each iteration;
    updating, by the apparatus, a velocity of the each particle according to the individual optimal solution and the global optimal solution for the each iteration; and
    optimizing, by the apparatus, the network slicing topology according to the global optimal solution obtained in a last iteration of the particle swarm algorithm.

5. The method of claim 4, wherein the step of optimizing the network slicing topology by a particle swarm algorithm further comprises:
    terminating, by the apparatus, the particle swarm algorithm when the global optimal solution obtained in a (n+1)-th iteration being not better than the global optimal solution obtained in a n-th iteration, wherein n is a positive integer; and
    terminating, by the apparatus, the particle swarm algorithm when a number of iterations of the particle swarm algorithm reaches a preset iteration upper limit.

6. The method of claim 4, wherein the objective function comprises maximization of indicator values of the target KPIs.

7. The method of claim 4, wherein the initial velocity of the each particle is a random velocity value.

8. The method of claim 1, wherein the method further comprises:
    obtaining, by an apparatus, monitored KPIs set by the user; and
    analyzing, by the apparatus, indicator values of the monitored KPIs and performing detection of anomalies.

9. An apparatus for managing network slices, comprising: a processor; and a memory storing instructions when executed by the processor, cause the processor to perform operations, the operations comprising:
    determining, by an apparatus, whether to optimize a network slicing topology based on user inputs;
    obtaining, by the apparatus, target key performance indicators (KPIs), corresponding weightings, value intervals, and variables set by an user when the apparatus determines to optimize the network slicing topology;
    determining, by the apparatus, a slicing granularity according to the variables; and
    optimizing, by the apparatus, the network slicing topology by a particle swarm algorithm according to the target KPIs, the corresponding weightings and value intervals, the variables, and the slicing granularity.

10. A non-transitory computer readable storage medium storing a computer program, the computer program when executed by a processors, causes the processor to perform each step in a method of managing network slices, the method comprising:
    determining, by an apparatus, whether to optimize a network slicing topology based on user inputs;
    obtaining, by the apparatus, target key performance indicators (KPIs), corresponding weightings, value intervals, and variables set by an user when the apparatus determines to optimize the network slicing topology;
    determining, by the apparatus, a slicing granularity according to the variables; and
    optimizing, by the apparatus, the network slicing topology by a particle swarm algorithm according to the target KPIs, the corresponding weightings and value intervals, the variables, and the slicing granularity.

* * * * *